Feb. 7, 1933.  C. L. HALL  1,896,864
SNAP FASTENER ATTACHED CLIP MEMBER
Filed April 27, 1931
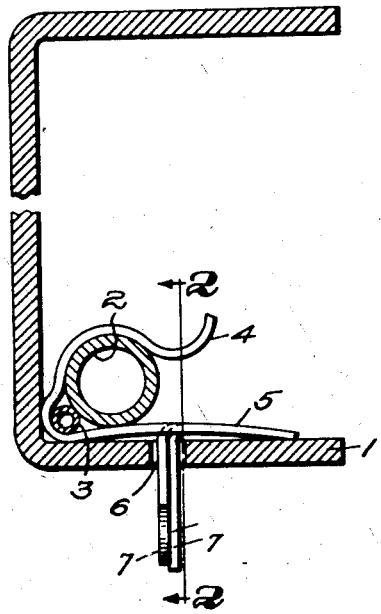
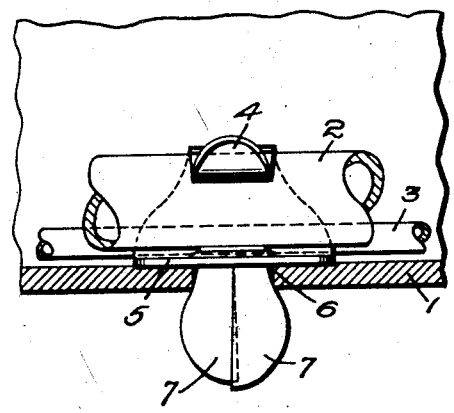
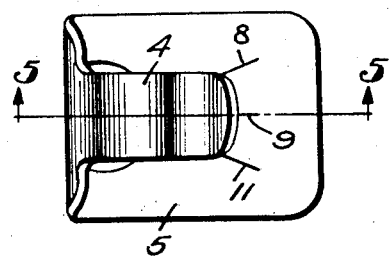
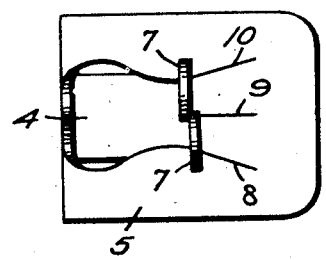
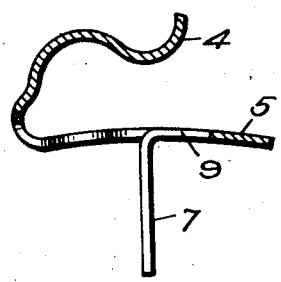
Inventor:
Charles L. Hall
By Emery, Booth, Varney & Townsend
Attys Patented Feb. 7, 1933

1,896,864

UNITED STATES PATENT OFFICE

CHARLES L. HALL, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

SNAP FASTENER ATTACHED CLIP MEMBER

Application filed April 27, 1931. Serial No. 533,038.

My invention aims to provide improvements in snap fastener attached clip members for holding in position pipes, wires and the like.

In the drawing which illustrates a preferred embodiment of my invention:—

Figure 1 is a section through an installation embodying my invention and showing one type of clip member in elevation;

Fig. 2 is a section taken on the line 2—2 of Figure 1, the clip member being shown in elevation;

Fig. 3 is a top plan view of the clip member;

Fig. 4 is a bottom plan view of the clip member; and

Fig. 5 is a section of the clip device taken on the line 5—5 of Fig. 3.

My improved clip device is particularly, though not exclusively, useful in connection with securing conductor members, such as gasoline pipes, air pipes and electric wires, to structures such as automobile bodies and frames.

In the particular embodiment of my invention selected for illustration by the drawing I have shown in Figs. 1 and 2 a channel iron 1 of a motor vehicle frame, or the like, in the hollow of which I have shown a gasoline pipe 2 and an air pipe 3 secured in position by means of my improved clip-like device. The gasoline pipe 2 is used to convey gasoline from the gasoline storage tank (not shown) to the carburetor (not shown) and the air pipe 3 is used in connection with the operation of a vacuum operated windshield cleaner, as will be well understood.

By using fastening devices adapted to be detachably secured to the frame structure, as by snap fastener elements, I have found that the conductor members may be easily attached and removed. The clamping means of the fastening devices may be variously constructed, but I have shown a device wherein the device is made from a minimum of material.

The fastening device shown in the drawing comprises a clip-like member having a clip portion formed by bending a strip of metal to form two fingers 4 and 5. Each finger is connected at one end to the other finger while the other ends remain free to permit expansion and contraction when a pipe is being inserted between or withdrawn from the fingers. The shape of each finger may vary so that different sized pipes may be accommodated. Furthermore, one or both of the fingers 4 and 5 are provided with portions to fit the contour of the conductor member if it is desirable to so construct the devices.

The clip device (Figure 1) has its finger 4 so shaped and spaced from the finger 5 that it will engage both the small air pipe 3 and the relatively larger gasoline pipe 2 and the finger 5 is slightly curved longitudinally thereby to cooperate with the finger 4 and hold the pipes 2 and 3 securely in position.

Any suitable snap fastening means may be used to secure the clip members to the supporting structure. However, in the drawing, I have shown the snap fastening means as being in the form of a stud extending from the finger 5 through an aperture 6 in the channel iron 1. The stud member is provided by pressing two engaging members 7—7 from the material of the finger 5 and having them extend at right angles thereto. These engaging members 7—7 are permitted to yield by cutting slits 8, 9 and 10 in the finger 5 (Fig. 4) so that when they are engaged with the wall surrounding the aperture 6 they may move toward each other to snap into the aperture in the usual manner. In order to save material, the members 7—7 (Figs. 4 and 5) are cut from the material inwardly from the free end so that they are located about midway between the ends of the finger 5. The slits 8, 9 and 10 extend toward but not to the free end of the finger 5 and thereby leave the periphery of the finger in a smooth uninterrupted edge. Thus the devices are easier to handle and do not readily become entangled with one another during shipment.

My invention is decidedly useful because it can be attached and removed very readily, thereby making it less expensive to install wires, pipes and the like in motor vehicles. No riveting or bolting of clips into place is necessary and furthermore the conductors may in some instances be removed from a clip, or clips, without removing the clip, or clips, from the frame structure. Furthermore, the clip members are simple and inexpensive to manufacture and are reduced to a minimum as to amount of material needed to construct them.

While I have illustrated and described a preferred embodiment of my invention, I do not wish to be limited thereby, because the scope of my invention is best defined by the following claims.

I claim:

1. A clip device formed from a single piece of sheet metal bent to form a pair of fingers between which may be engaged a member to be held in place by said clip device and a pair of thin, edgewisely movable socket-engaging portions formed from material entirely between the ends of the said pair of fingers for the purposes described.

2. A clip device formed from a single piece of sheet metal bent to form a pair of fingers between which may be engaged a member to be held in place by said clip device and a pair of thin edgewisely movable socket-engaging portions formed from material entirely between the ends of the said pair of fingers, said socket-engaging portions extending from one of said fingers and said finger having a slit formed therein and extending only part way between the said portions and the free end of said finger to permit yielding movement of said fingers.

3. A clip device formed from a single piece of sheet metal bent into a U-shaped structure having two fingers 4 and 5 for holding a conduit between them, a pair of socket-engaging portions 7—7 pressed from one of said fingers 5 and extending therefrom normal to the plane thereof, said finger 5 being divided by slits 8, 9 and 10 at that side of the portions 7—7 toward the free end of said finger to permit yielding of said portions and said portions 7—7 being formed from the material of said finger 5 at that side opposite the slits.

In testimony whereof, I have signed my name to this specification.

CHARLES L. HALL.